(12) United States Patent
Kim et al.

(10) Patent No.: US 11,760,321 B2
(45) Date of Patent: *Sep. 19, 2023

(54) EMERGENCY BRAKING CONTROL METHOD FOR VEHICLE

(71) Applicant: HYUNDAI MOBIS CO., LTD., Seoul (KR)

(72) Inventors: Du Hyung Kim, Yongin-si (KR); Yun Jung Jo, Yongin-si (KR); Jung Gue Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 163 days.

This patent is subject to a terminal disclaimer.

(21) Appl. No.: 17/404,955

(22) Filed: Aug. 17, 2021

(65) Prior Publication Data

US 2022/0111823 A1 Apr. 14, 2022

Related U.S. Application Data

(63) Continuation of application No. 16/249,832, filed on Jan. 16, 2019, now Pat. No. 11,124,164.

(30) Foreign Application Priority Data

Jan. 17, 2018 (KR) .................. 10-2018-0006046

(51) Int. Cl.
*B60T 7/22* (2006.01)

(52) U.S. Cl.
CPC .......... *B60T 7/22* (2013.01); *B60T 2201/022* (2013.01); *B60T 2210/10* (2013.01); *B60T 2210/32* (2013.01)

(58) Field of Classification Search
CPC .. B60T 7/22; B60T 2201/022; B60T 2210/10; B60T 2210/32; B60T 8/171;
(Continued)

(56) References Cited

U.S. PATENT DOCUMENTS

| 8,204,276 B2 | 6/2012 | Higuchi et al. |
| 2013/0144498 A1* | 6/2013 | Kim .................. B60T 7/22 701/70 |

(Continued)

FOREIGN PATENT DOCUMENTS

| JP | 2000-207563 | 7/2000 |
| JP | 2006-073013 | 3/2006 |

(Continued)

OTHER PUBLICATIONS

Non-Final Office Action dated Feb. 8, 2021, in U.S. Appl. No. 16/249,832.

(Continued)

*Primary Examiner* — Mary Cheung
(74) *Attorney, Agent, or Firm* — H.C. Park & Associates, PLC

(57) ABSTRACT

An emergency braking control method for a vehicle may include: controlling, by a controller, an ambient information detector to take an image of surroundings of the road on which a vehicle is traveling; controlling, by the controller, a camera recognition fail state detector to analyze the image taken by the ambient information detector, and to determine a severity level of a temporary camera recognition fail state; and controlling, by the controller, an operation of an emergency braking apparatus or setting a control strategy according to the severity level of the temporary camera recognition fail state.

7 Claims, 8 Drawing Sheets

(58) Field of Classification Search
CPC ...... B60W 30/09; B60W 10/18; B60W 40/02; B60W 40/105; B60W 2420/42; B60W 2520/10; B60S 1/0818; B60R 2021/003
See application file for complete search history.

(56) References Cited

U.S. PATENT DOCUMENTS

| | | | |
|---|---|---|---|
| 2017/0108863 A1* | 4/2017 | Chundrlik, Jr. ... | B60W 50/0205 |
| 2018/0178766 A1* | 6/2018 | Oba ................ | B60W 60/00253 |
| 2019/0049948 A1* | 2/2019 | Patel .................... | G05D 1/0276 |
| 2019/0202373 A1* | 7/2019 | Kubota ................ | H04N 13/246 |

FOREIGN PATENT DOCUMENTS

| | | |
|---|---|---|
| JP | 2008-197863 | 8/2008 |
| JP | 2016-057959 | 4/2016 |
| KR | 10-2011-0020700 | 3/2011 |
| KR | 10-1360683 | 2/2014 |
| KR | 10-2015-0034906 | 4/2015 |

OTHER PUBLICATIONS

Notice of Allowance dated May 18, 2021, in U.S. Appl. No. 16/249,832.

\* cited by examiner

EMERGENCY BRAKING CONTROL METHOD FOR VEHICLE

CROSS-REFERENCES TO RELATED APPLICATION

The present application is a Continuation of U.S. patent application Ser. No. 16/249,832, filed on Jan. 16, 2019, which claims priority from and the benefit of Korean Patent Application No. 10-2018-0006046, filed on Jan. 17, 2018, which is hereby incorporated by reference for all purposes as if set forth herein.

BACKGROUND

Field

Exemplary embodiments relate to an emergency braking control method for a vehicle, and more particularly, to an emergency braking control method for a vehicle, which can previously acquire information on a section in which a pedestrian is highly likely to suddenly appear in front of a vehicle on the route where the vehicle is traveling, and previously raise braking pressure in a stepwise manner depending on the possibility that a pedestrian will suddenly appear, thereby shortening an emergency braking time.

DISCUSSION OF THE BACKGROUND

In general, an autonomous emergency brake referred to as an emergency braking assist system indicates a smart safety system that reduces damage by allowing a vehicle to automatically recognize an object or pedestrian in front of the vehicle and actively operate a brake, when the vehicle is expected to collide with the object or pedestrian.

The autonomous emergency brake autonomously analyzes a situation ahead of the vehicle through a camera or radar mounted on the vehicle, and reduces the speed or stops the vehicle through the brake, based on the time to collision (TTC) with a preceding vehicle and the relative speed between the ego vehicle and the preceding vehicle, when a driver does not actively takes action.

Typically, the autonomous emergency brake previously outputs warnings to a user (driver) in stages. Specifically, the autonomous emergency brake announces 'caution ahead' as a first warning, announces 'caution rear-end collision' as a second warning, and enters into 'emergency braking' as a third warning. When an automatic sensor senses a collision risk element ahead, the autonomous emergency brake vibrates the steering wheel or makes a sound to output a warning to the driver, before a TTC of 1.8 sec, for example. When the driver does not take action, the autonomous emergency brake may intervene in the emergency braking system to force the brake to operate.

When a preceding target which is likely to collide with the vehicle is sensed at a designated distance or more in advance, the autonomous emergency brake can respond in a stepwise manner. For example, the autonomous emergency brake may output a warning and then force the brake to operate. However, when a target is not sensed at the designated distance or more in advance but suddenly appears in front of the vehicle, the autonomous emergency brake needs to immediately operate the brake.

However, in this case that the autonomous emergency brake needs to immediately operate the brake due to the target which suddenly appears in front of the vehicle, a typical time delay required for raising braking pressure may occur to degrade the braking performance.

Therefore, the autonomous emergency brake needs to not only sense a target which is likely to collide, but also previously acquire information on a section where a pedestrian is highly likely to suddenly appear in front of the vehicle. Then, when the vehicle travels on the corresponding section where a pedestrian is highly likely to suddenly appear, the autonomous emergency brake needs to previously raise the braking pressure in a stepwise manner, in order to prevent a time delay required for raising the braking pressure. In this way, the autonomous emergency brake requires preparation for shortening the emergency braking time.

Besides, the performance of a sensor mounted in the vehicle or particularly a multi-function camera (MFC) has been improved while the MFC has competitiveness with respect to a radar. Therefore, a lot of application functions to which the camera sensor is applied are developed and applied.

However, the performance of the MFC may be degraded depending on an environmental condition, for example, snow, rain or moisture, and the autonomous emergency brake may be unnecessarily turned on/off. Therefore, the function activation areas of the autonomous emergency brake may be limited while the robustness thereof is reduced.

The related art of the present invention is disclosed in Korean Patent Registration No. 10-1360683 registered on Feb. 3, 2014 and entitled "Emergency braking control apparatus and method based on vehicle condition information".

The above information disclosed in this Background section is only for enhancement of understanding of the background of the invention and, therefore, it may contain information that does not constitute prior art.

SUMMARY

Exemplary embodiments of the present invention are directed to an emergency braking control method for a vehicle, which detects a temporary camera recognition fail state, controls an emergency braking apparatus to decrease the severity level of the temporary camera recognition fail state, acquires accurate information on a section where a pedestrian is highly likely to suddenly appear, and controls braking pressure depending on the possibility that a pedestrian will suddenly appear.

In one embodiment, an emergency braking control method for a vehicle may include: controlling, by a controller, an ambient information detector to take an image of surroundings of the road on which a vehicle is traveling; controlling, by the controller, a camera recognition fail state detector to analyze the image taken by the ambient information detector, and to determine a severity level of a temporary camera recognition fail state; and controlling, by the controller, an operation of an emergency braking apparatus or setting a control strategy according to the severity level of the temporary camera recognition fail state.

The controller may set the control strategy to any one of normal control, control maintenance attempt and operation suspension on the emergency braking apparatus.

When performing the control maintenance attempt on the emergency braking apparatus, the controller may control a moisture remover to remove moisture on a windshield of the vehicle or temporarily suspend the operation of the emergency braking apparatus.

In the controlling of the operation of the emergency braking apparatus or the setting of the control strategy, the controller may control an environment information receiver to receive environment information on a section in front of the vehicle, and set the control strategy of the emergency braking apparatus according to the received environment information and the severity level.

The controller may calculate time required for reaching the section in front and time required for passing the section in front, using the environment information and the speed of the ego vehicle, and set the control strategy of the emergency braking apparatus according to the calculated time for reaching the section in front, the calculated time for passing the section in front, and the severity level.

The environment information may include one or more of the type of an external environment condition, time required for a preceding vehicle to pass a preset poor environment section, a distance (km) of the environment section, and a distance to the section in front.

The emergency braking control method may further include shortening, by the controller, an emergency braking time by previously raising the braking pressure of the vehicle in a stepwise manner, when the operation of the emergency braking apparatus is controlled or the control strategy is normal control.

The shortening of the emergency braking time may include: receiving, by the controller, the traveling route or road information of the vehicle and information around the road; checking, by the controller, whether the current traveling section is a section with preset deceleration information, based on the received information; setting, by the controller, the braking pressure to a ready state for a first level, when the current traveling section is a section with preset deceleration information; detecting, by the controller, one or more pieces of pedestrian-related information around the road by processing the image taken by the camera; and calculating, by the controller, a collision risk with a pedestrian through a designated method, when the pedestrian-related information is checked, and setting the braking pressure to a ready state for a second level when the collision risk is higher than a preset reference value.

The shortening of the emergency braking time may include: controlling, by the controller, a camera to take an image of the traveling route of the vehicle or information around the road, and detecting one or more pieces of pedestrian-related information around the road by processing the taken image; checking, by the controller, whether the number of pedestrians is larger than a preset threshold value and an exposure time is larger than a preset threshold time, when the pedestrian-related information is checked; setting, by the controller, the braking pressure to a ready state for a first level, when the check result indicates that the number of pedestrians is larger than the preset threshold value and the exposure time is larger than the preset threshold time; and calculating, by the controller, a collision risk with a pedestrian through a designated method, based on the checked pedestrian-related information, and setting the braking pressure to a ready state for a second level when the collision risk is higher than a preset reference value.

The shortening of the emergency braking time may include: receiving, by the controller, the traveling route or road information of the vehicle and information around the road; checking, by the controller, whether the current traveling section is a section with preset deceleration information, based on the received information; setting, by the controller, the braking pressure to a ready state for a first level, when the current traveling section is a section with preset deceleration information; controlling, by the controller, a camera to take an image of the traveling route of the vehicle or the information around the road, and detecting one or more pieces of pedestrian-related information around the road by processing the taken image, when the current traveling section is a section with no preset deceleration information; checking, by the controller, whether the number of pedestrians is larger than a preset threshold value and an exposure time is larger than a preset threshold time, when the pedestrian-related information is checked; setting, by the controller, the braking pressure to the ready state for the first level, when the check result indicates that the number of pedestrians is larger than the preset threshold value and the exposure time is larger than the preset threshold time; and calculating, by the controller, a collision risk with a pedestrian through a designated method, based on the checked pedestrian-related information, and setting the braking pressure to a ready state for a second level when the collision risk is higher than a preset reference value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

DETAILED DESCRIPTION OF THE ILLUSTRATED EMBODIMENTS

Figure 1:
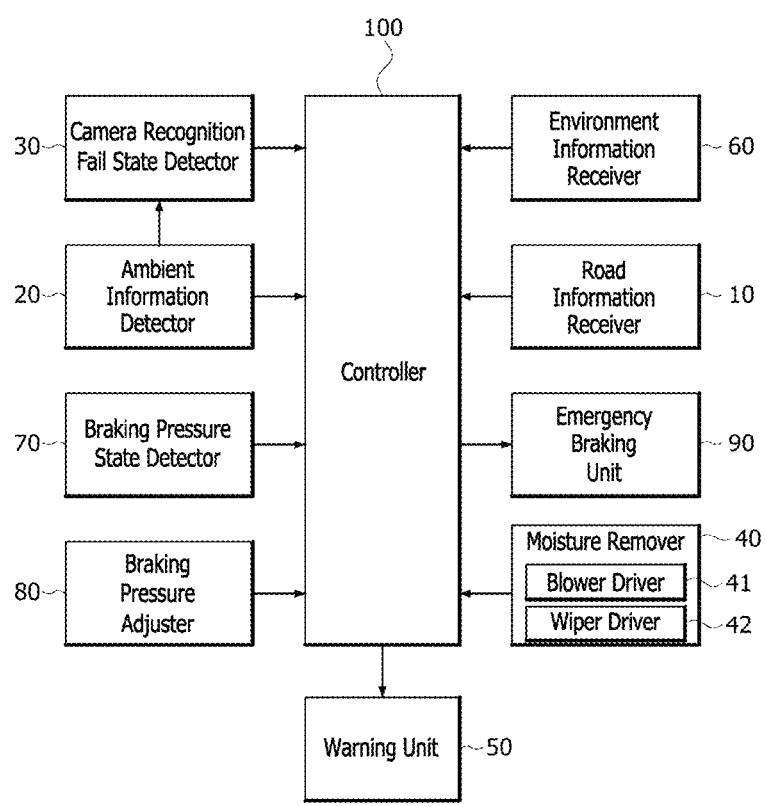
FIG. 1 is a block diagram illustrating an emergency braking control apparatus for a vehicle in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, an emergency braking control method for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
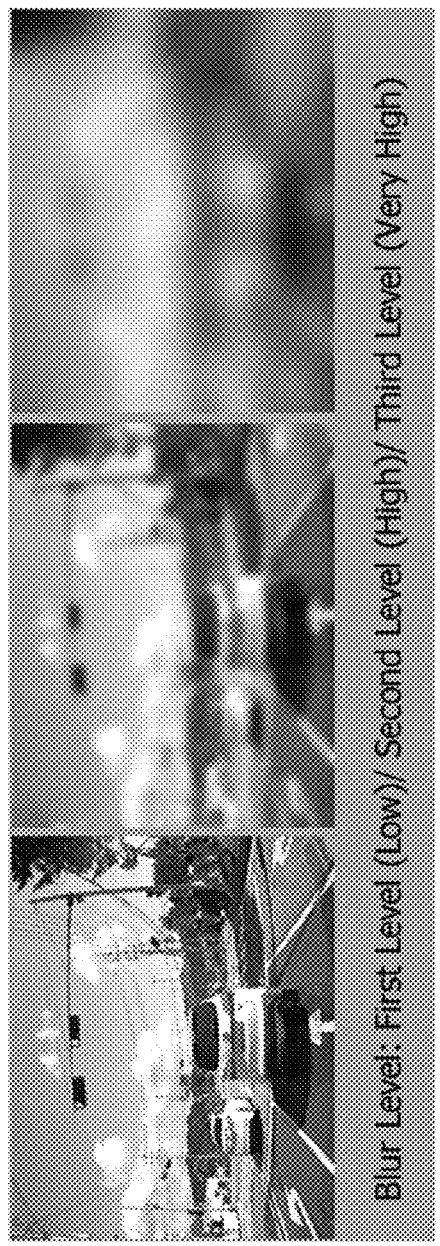
FIG. 2 shows the severity levels of a temporary camera recognition fail state in accordance with the embodiment of the present invention.
Figure 3:
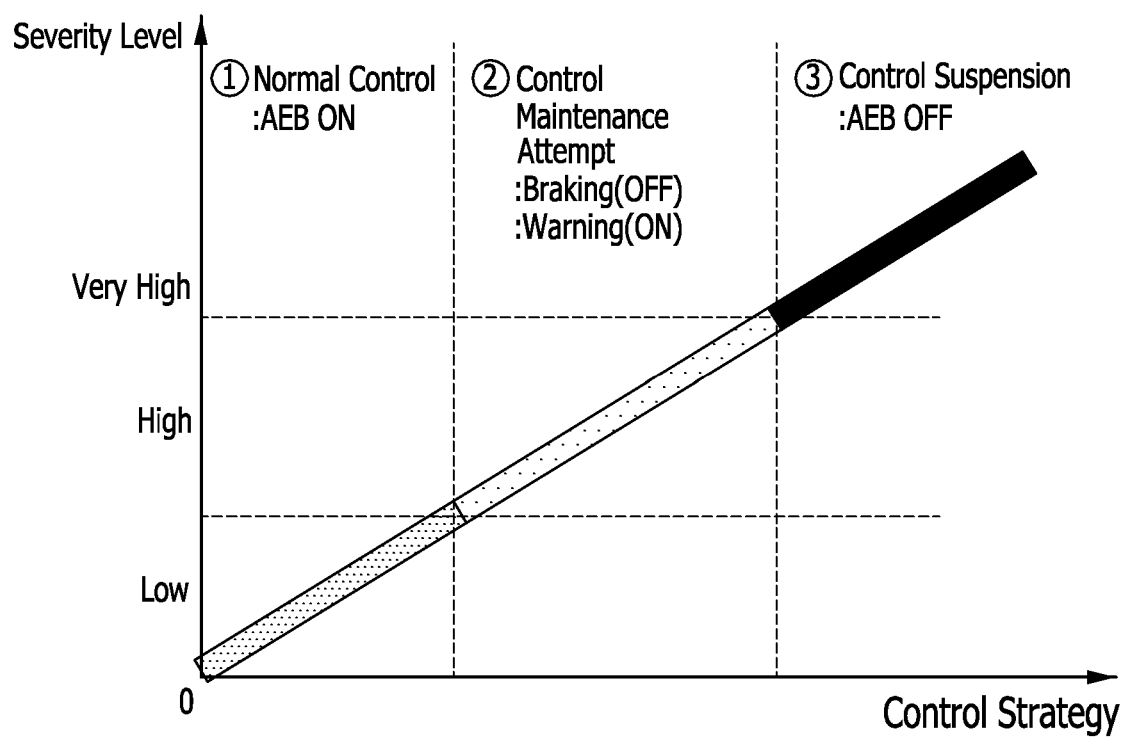
FIG. 3 conceptually illustrates control powers depending on the severity levels of the temporary camera recognition fail state in accordance with the embodiment of the present invention.

FIG. 1 is a block diagram illustrating an emergency braking control apparatus for a vehicle in accordance with an embodiment of the present invention, FIG. 2 shows the severity levels of a temporary camera recognition fail state in accordance with the embodiment of the present invention, and FIG. 3 conceptually illustrates control powers depending on the severity levels of the temporary camera recognition fail state in accordance with the embodiment of the present invention.

Referring to FIG. 1, the emergency braking control apparatus for a vehicle in accordance with the embodiment of the present invention may include a road information receiver 10, an ambient information detector 20, a camera recognition fail state detector 30, a moisture remover 40, a warning unit 50, an environment information receiver 60, a braking pressure state detector 70, a braking pressure adjuster 80, an emergency braking unit 90 and a controller 100.

The road information receiver 10 may receive a route (or road) on which a vehicle travels and information around the route.

The road information receiver 10 may receive the route (or road) and the information around the route from a navigation system (not illustrated) mounted in the vehicle or a navigation server (not illustrated) connected through wireless communication, for example, a road guidance server.

The route (or road) and the information around the route may not only simply indicate the speed limit for each location, but also include one or more pieces of pedestrian-related statistical information among statistical information on the number of pedestrians for each day of the week or each hour of the day, statistical information on the average age of pedestrians, and statistical information on traffic accidents.

Thus, the road information receiver 10 may communicate with one or more servers which provide different types of information, in addition to the navigation server (for example, a road guidance server). Examples of the one or more servers may include a traffic accident information providing server, a statistical information providing server and the like.

The ambient information detector 20 may detect various pieces of information around the road on which the vehicle is traveling, or particularly pedestrian information, using sensors mounted in the vehicle.

The ambient information detector 20 may detect pedestrians in front and side front of the vehicle, which are within a designated distance from the current location of the vehicle on the traveling road, using a camera sensor mounted in the vehicle.

For example, the ambient information detector 20 may take an image of the surroundings using the camera sensor, and process the taken image to recognize the pedestrians in front and side front of the vehicle, who are within the designated distance from the current location. Alternatively, the ambient information detector 20 may simply take an image of the surroundings, and the controller 100 may process the taken image to recognize the pedestrians in front and side front of the vehicle, who are within the designated distance from the current location.

The ambient information detector 20 and the controller 100 may check information on the number of recognized pedestrians and exposure time information.

When an excessive number of pedestrians are included in one frame of the image, it is not actually easy to count the number of pedestrians within a short time, while much load is consumed. Thus, when the pedestrians in the taken image are not separated from each other but overlap each other, the exposure time information may be used to indicate how many pedestrians are standing in a row on a pedestrian passage, without directly counting the number of pedestrians. The exposure time information may include a kind of length information on successive pedestrians between whom the space is smaller than a designated distance.

The camera recognition fail state detector 30 may analyze the image taken through the camera sensor of the ambient information detector 20, and detect a temporary camera recognition fail state to determine whether recognition and sensing are possible.

The temporary camera recognition fail state may be caused by an external factor of the vehicle, an environmental factor and an internal factor of the vehicle.

The external factor of the vehicle may include a blockage caused by a foreign matter such as snow or rain, and the blockage may be divided into a full blockage and a partial blockage.

The environmental factor may include low sun, splash, fog, self glare, a smeared spot and the like.

The internal factor of the vehicle may include a blurred image, a frozen windshield, sunray and the like.

The camera recognition fail state detector 30 may determine the severity level of the temporary camera recognition fail state.

Referring to FIG. 2, the severity level of the temporary camera recognition fail state may be divided into three levels depending on blur levels.

In this case, as illustrated in FIG. 3, a control strategy may be set in the emergency braking apparatus according to the severity level of the temporary camera recognition fail state. For example, the controller 100 may normally control the emergency braking apparatus when the severity level is low, attempt to maintain control over the emergency braking apparatus when the severity level is high, and turn off the emergency braking apparatus when the severity level is very high.

The moisture remover 40 may remove moisture on the windshield of the vehicle. The moisture remover 40 may include a blower driver 41 and a wiper driver 42.

The blower driver 41 may send air to the windshield, and the wiper driver 42 may remove rainwater or the like on the windshield.

The moisture remover 40 may include components other than the blower driver 41 and the wiper driver 42, as long as the components can be used to remove water on the windshield.

The warning unit 50 may warn a driver about the severity level of the temporary camera recognition fail state, using an image or voice. The warning unit 50 may employ a cluster or the like.

The environment information receiver 60 may receive environment information of a section in front of the vehicle through vehicle to everything (V2X) communication. The environment information may include the type of an external environment condition such as rain, snow or fog, fail information on a section of the driving route of the ego vehicle, where a preceding vehicle has passed, time required for passing a section of the driving route of the ego vehicle, where a preceding vehicle has passed, and a distance to a section in front.

The braking pressure state detector 70 may detect the current braking pressure state (for example, brake fluid pressure or the like).

For example, the braking pressure state detector 70 may detect the current braking pressure state by converting the current braking pressure state into a ratio, based on the supposition that the state in which wheels are completely braked not to rotate is 100%.

The braking pressure adjuster 80 may adjust the braking pressure of the brake (for example, brake fluid pressure or the like) to a designated ratio, according to control of the controller 100. However, an actuator for adjusting the braking pressure may be changed depending on the type of the braking method of the brake.

The emergency braking unit 90 may force the brake to operate, when the driver does not take action even though warnings in stages were outputted in the case that a target (for example, a pedestrian, obstacle, animal or the like) which has been observed in advance suddenly appeared in front of the ego vehicle, or when the time required for the driver to take action is shorter than a designated time (for example, a statistical time required until the driver steps on the brake after recognizing a target) in the case that the target suddenly appears even though warnings in stages were not outputted.

The controller 100 may control the ambient information detector 20 to detect various pieces of information around the road on which the ego vehicle is traveling, or particularly pedestrian information, using the sensors mounted in the vehicle.

Then, the controller 100 may control the ambient information detector 20 to detect pedestrians in front and side front of the vehicle, who are within a designated distance from the current location of the vehicle on the traveling road, using the camera sensor mounted in the vehicle.

At this time, the controller 100 may control the camera recognition fail state detector 30 to analyze the image taken by the camera sensor of the ambient information detector 20, to detect a temporary camera recognition fail state for determining whether recognition and sensing are possible, and to determine the severity level of the temporary camera recognition fail state.

According to the severity level of the temporary camera recognition fail state, the controller 100 may control the moisture remover 40 to remove moisture on the windshield of the vehicle or control the warning unit 50 to output the severity level of the temporary camera recognition fail state. Furthermore, the controller 100 may set a control strategy for the operation of the emergency braking apparatus, according to the severity level of the temporary camera recognition fail state.

The controller 100 may control the environment information receiver 60 to receive the environment information of a section in front of the vehicle through V2X communication, and calculate the time required for reaching the section in front and the time required for passing the section, using the environment information and the speed of the ego vehicle. The environment information may include the type of the external environment condition, the distance (km) of the section in front, and the distance to the section in front.

Then, the controller 100 may set the control strategy of the emergency braking apparatus according to the time required for reaching the section in front, the time required for passing the section in front, and the severity level.

In particular, when the emergency braking apparatus is operated according to the severity level of the temporary camera recognition fail state or the control strategy is normal control, the controller 100 may previously acquire information on a section where a pedestrian is highly likely to suddenly appear in front of the vehicle on the route where the vehicle is traveling, and previously raise the braking pressure in a stepwise manner depending on the possibility that a pedestrian will suddenly appear, thereby shortening the emergency braking time.

So far, the functions of the components 110 to 160 have been separately described in order to promote understandings of the operation in accordance with the present embodiment. In an embodiment, however, the controller 100 may collectively perform the functions of the components 110 to 160, or perform one or more of the functions of the components 110 to 160.

Hereafter, an emergency braking control method for a vehicle in accordance with an embodiment of the present invention will be described in detail with reference to FIGS. 4 to 8.

Figure 4:
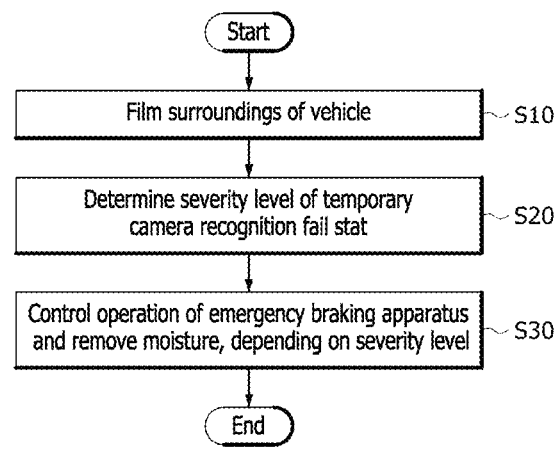
FIG. 4 illustrates an example of a process of setting a control strategy of the emergency braking control method for a vehicle in accordance with the embodiment of the present invention.

FIG. 4 illustrates an example of a process of setting a control strategy of the emergency braking control method for a vehicle in accordance with the embodiment of the present invention.

Referring to FIG. 4, the controller 100 may control the ambient information detector 20 to take an image of the surroundings of the road on which the vehicle is traveling, using the sensor mounted in the vehicle, at step S10.

At this time, the controller 100 may control the camera recognition fail state detector 30 to analyze the image taken by the camera sensor of the ambient information detector 20, to detect a temporary camera recognition fail state for determining whether recognition and sensing are possible, and to determine the severity level of the temporary camera recognition fail state, at step S20.

As the severity level of the temporary camera recognition fail state is determined, the controller 100 may control the moisture remover 40 to remove moisture on the windshield of the vehicle or control the warning unit 50 to output the severity level of the temporary camera recognition fail state. Furthermore, the controller 100 may set a control strategy for an operation of the emergency braking apparatus, according to the severity level of the temporary camera recognition fail state, at step S30.

For example, the controller 100 may perform normal control on the emergency braking apparatus when the severity level is low, attempt to maintain control over the emergency braking apparatus when the severity level is high, and turn off the emergency braking apparatus when the severity level is very high.

When the emergency braking apparatus is operated according to the severity level of the temporary camera recognition fail state or operated according to the control strategy, the controller 100 may previously acquire information on a section where a pedestrian is highly likely to suddenly appear in front of the vehicle on the route where the vehicle is traveling, and previously raise the braking pressure in a stepwise manner depending on the possibility that a pedestrian will suddenly appear, thereby shortening the emergency braking time.

Figure 5:
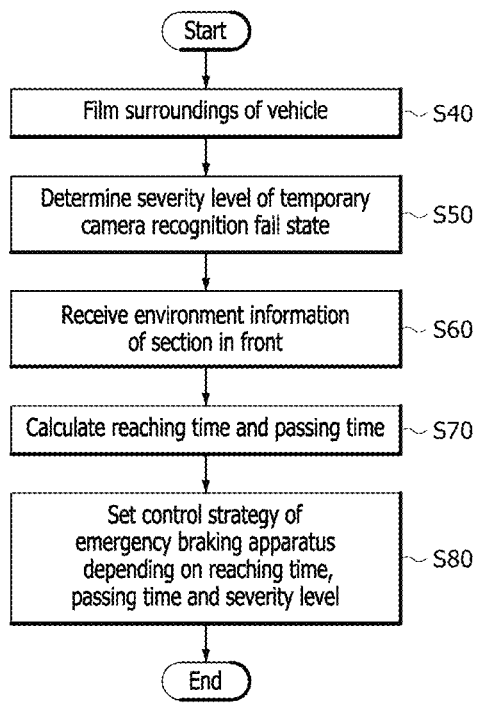
FIG. 5 illustrates another example of the process of setting a control strategy of the emergency braking control method for a vehicle in accordance with the embodiment of the present invention.

FIG. 5 illustrates another example of the process of setting a control strategy of the emergency braking control method for a vehicle in accordance with the embodiment of the present invention.

Referring to FIG. 5, the controller 100 may control the ambient information detector 20 to take an image of the surroundings of the road on which the vehicle is traveling, using the sensor mounted in the vehicle, at step S40.

At this time, the controller 100 may control the camera recognition fail state detector 30 to analyze the image taken by the camera sensor of the ambient information detector 20, to detect a temporary camera recognition fail state for determining whether recognition and sensing are possible, and to determine the severity level of the temporary camera recognition fail state, at step S50.

Then, the controller 100 may control the environment information receiver 60 to receive the environment information of a section in front of the vehicle through V2X communication, at step S60. The environment information may include the type of the external environment condition, the distance (km) of the section in front and the distance to the section in front.

Then, the controller 100 may detect the speed of the ego vehicle, and calculate the time required for reaching the section in front and the time required for passing the section in front, using the environment information and the speed of the ego vehicle, at step S70.

As the time required for reaching the section in front and the time required for passing the section in front are calculated, the controller 100 may set the control strategy of the emergency braking apparatus according to the time required for reaching the section in front, the time required for passing the section in front, and the severity level, at step S80.

Figure 6:
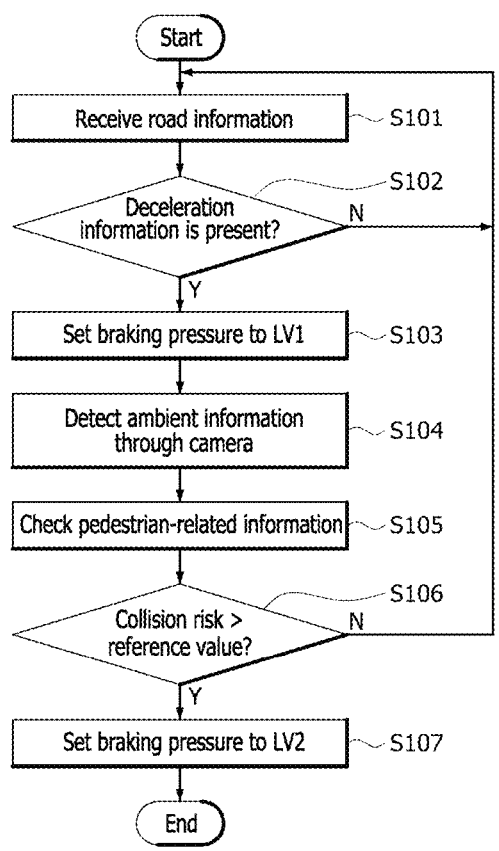
FIG. 6 is a flowchart illustrating an example of a process of controlling braking pressure in the emergency braking control method for a vehicle in accordance with the embodiment of the present invention.
Figure 7:
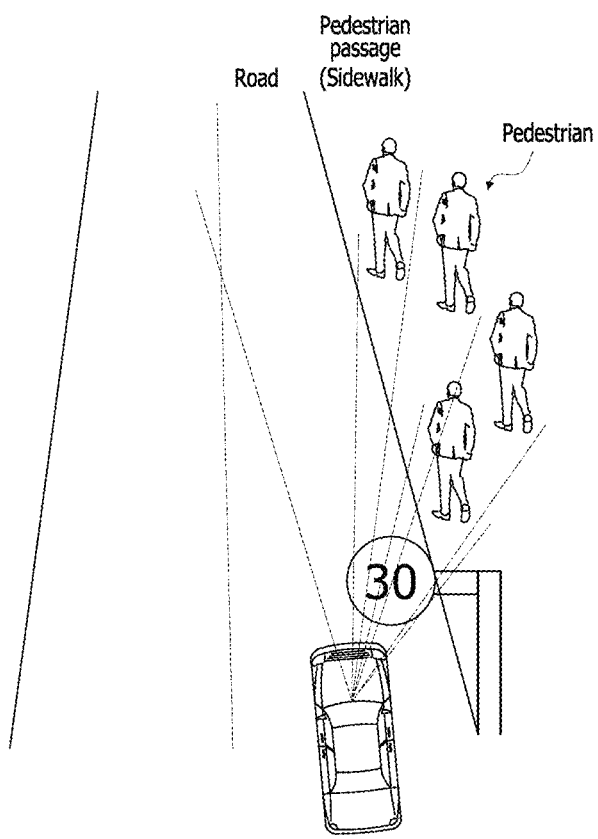
FIG. 7 illustrates a method for detecting pedestrian-related information around the road using a camera sensor, in accordance with the embodiment of the present invention.

FIG. 6 is a flowchart illustrating an example of a process of controlling braking pressure in the emergency braking control method for a vehicle in accordance with the embodiment of the present invention, and FIG. 7 illustrates a method for detecting pedestrian-related information around the road using a camera sensor, in accordance with the embodiment of the present invention.

Referring to FIG. 6, the controller 100 may receive the route (or road) on which the vehicle is traveling and information around the route from a navigation system (not illustrated) mounted in the vehicle or one or more servers (not illustrated) to provide specific information connected through wireless communication, at step S101. The one or more servers may include a road guidance server, a traffic accident information providing server, a statistical information providing server and the like.

The route and the information around the route may not only simply indicate the speed limit for each location, but also include one or more pieces of pedestrian-related statistical information among statistical information on the number of pedestrians for each day of the week or each hour of the day, statistical information on the average age of pedestrians, and statistical information on traffic accidents.

Based on the received path and information, the controller 100 may check whether there is preset deceleration information, at step S102.

The deceleration information may indicate information which is provided to prepare for a traffic accident because there is a traffic accident occurrence risk. For example, the deceleration information may guide a driver to perform emergency braking or to decelerate the vehicle, in order to minimize shock even though an accident occurs.

Thus, the deceleration information may include information that is determined according to a designated speed limit due to a school zone or roadwork, and information that is provided for a section where an accident is highly likely to occur, based on statistical information in accordance with the present embodiment. The statistical information may include statistical information on the number of pedestrians for each day of the week or each hour of the day, statistical information on the average age of pedestrians, and statistical information on traffic accidents.

When the check result indicates that there is deceleration information for the corresponding driving section (Y at step S102), the controller 100 may set the braking pressure to a ready state for a first level LV1 at step S103.

The ready state for the first level LV1 may indicate raising the braking pressure to a ready state for a predetermined level (for example, 30%), based on a braking pressure level of 100%.

Furthermore, as illustrated in FIG. 7, the controller 100 may detect ambient information through the ambient information detector 20 or the camera sensor at step S104. The ambient information may include a pedestrian, obstacle, animal or the like.

For convenience of description, FIG. 6 illustrates that the controller 100 detects the ambient information at step S140 after raising the braking pressure to the ready state for the predetermined level (for example, 30%). However, this is only an example for convenience of description. Thus, in another embodiment, the ready state for the braking pressure may be set to another level regardless of the first level LV1.

The controller 100 may control the ambient information detector 20 (or the camera sensor) to take an image of the surroundings, process the taken image to recognize pedestrians in front and side front of the vehicle, who are within a predetermined distance from the current location, and check pedestrian-related information around the road (for example, on a pedestrian passage or sidewalk), at step S105. The information related to pedestrians may include the number of recognized pedestrians and exposure time information.

When an excessive number of pedestrians are included in one frame of the image, it is not actually easy to count the number of pedestrians within a short time, while much load is consumed. Thus, when the pedestrians in the taken image are not separated from each other but overlap each other, the exposure time information may be used to indicate how many pedestrians are standing in a row on a pedestrian passage, without directly counting the number of pedestrians. The exposure time information may include a kind of length information on successive pedestrians between whom the space is smaller than a designated distance.

When the pedestrian-related information is checked, the controller 100 may calculate a collision risk including the possibility that a pedestrian will walk into the route of the vehicle or a pedestrian variance index, and set the braking pressure to a ready state for a second level LV2 when the collision risk is higher than the a preset reference value (Y at step S106), at step S107.

The ready state for the second level LV2 may indicate raising the braking pressure to a ready state for a predetermined level (for example, 60%), based on the braking pressure level of 100%. More specifically, the ready state for the first or second level LV1 or LV2 may not indicate that the emergency braking control apparatus puts on the brakes, but indicate that the emergency braking control apparatus raises the braking pressure to prepare for braking. When performing emergency braking, the emergency braking control apparatus may immediately raise the braking pressure from the first or second level LV1 or LV2 (for example, the braking pressure of 30% or 60%), in order to put on the brakes.

Therefore, the emergency braking control apparatus can further shorten the emergency braking time than in the related art, thereby more efficiently preventing a pedestrian collision accident.

The collision risk, that is, the possibility that a pedestrian will walk into the route of the vehicle or the pedestrian variance index may be calculated through an equation of {a*fn(number of adults, moving speed)+1.5a*fn(number of children, moving speed)}. Here, a may represent weight information indicating that a collision risk for child is higher than a collision risk for adult, and the function fn may indicate that the moving speed of a adult and the moving speed of a child are differently reflected to calculate the collision risk. For reference, an adult and a child may be distinguished between each other based on the heights of pedestrians.

In the above embodiments, the emergency braking control method for a vehicle in the case that the deceleration information is present has been described. At this time, the deceleration information may be previously designated based on a place on the map (for example, school, kindergarten or the like). However, the actual road condition cam be varied. For example, when an event (for example, walkathon, demonstration or festival) occurs at a specific place, the number of pedestrians may temporarily increase.

In such an unspecified situation, the emergency braking control apparatus needs to monitor the surrounding situation even though deceleration information is not received, calculate a collision risk based on the number of pedestrians and the exposure time, and set a ready state for the braking pressure. This operation will be described in more detail with reference to FIG. 8.

Figure 8:
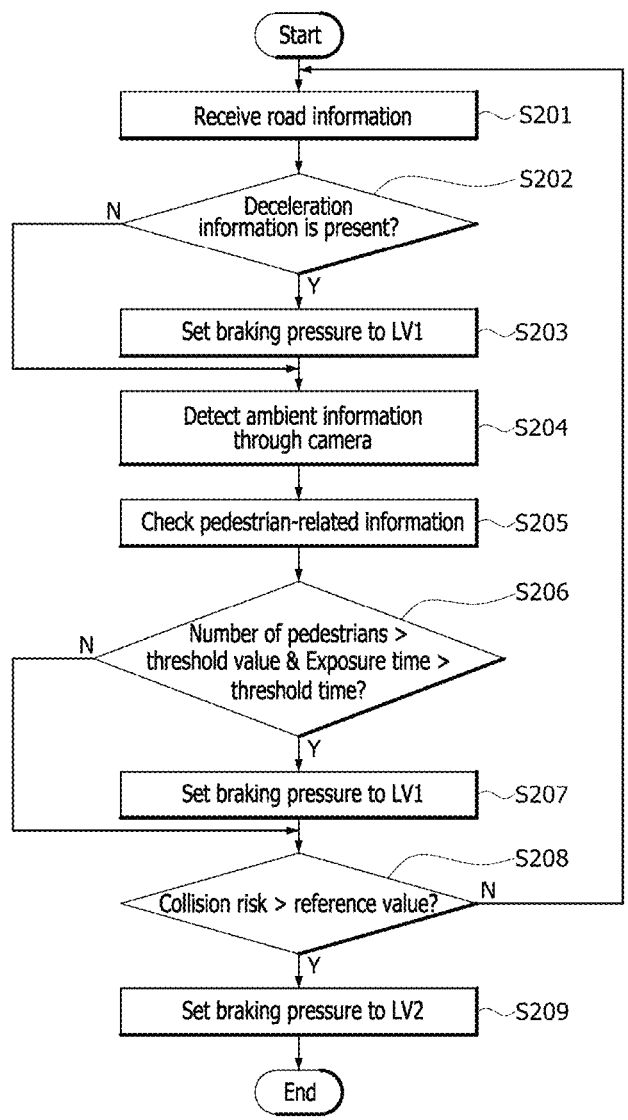
FIG. 8 is a flowchart illustrating another example of the process of controlling braking pressure in the emergency braking control method for a vehicle in accordance with the embodiment of the present invention.

FIG. 8 is a flowchart illustrating another example of the process of controlling braking pressure in the emergency braking control method for a vehicle in accordance with the embodiment of the present invention.

Referring to FIG. 8, the controller 100 may receive the route (or road) on which the vehicle is traveling and information around the route from the navigation system (not illustrated) mounted in the vehicle or one or more servers (not illustrated) to provide specific information connected through wireless communication, at step S201. The one or more servers may include a road guidance server, a traffic accident information providing server, a statistical information providing server and the like.

Based on the received path and information, the controller 100 may check whether there is preset deceleration information, at step S202.

When the check result indicates that there is deceleration information for the corresponding driving section (Y at step S202), the controller 100 may set the braking pressure to a ready state for a first level LV1 at step S203.

However, when the check result indicates that there is no deceleration information for the corresponding driving section (N at step S202), the controller 100 may detect ambient information (for example, pedestrian, obstacle or animal) only through the ambient information detector 20 or the camera sensor, at step S204.

The controller 100 may process the image taken through the ambient information detector 20 (or the camera sensor), recognize pedestrians in front and side front of the vehicle, who are within a predetermined distance from the current location, and check pedestrian-related information around the road (for example, on a pedestrian passage or sidewalk), at step S205. The information related to pedestrians may include the number of recognized pedestrians and the exposure time information.

When an excessive number of pedestrians are included in one frame of the image, it is not actually easy to count the number of pedestrians within a short time, while much load is consumed. Thus, when the pedestrians in the taken image are not separated from each other but overlap each other, the exposure time information may be used to indicate how many pedestrians are standing in a row on a pedestrian passage, without directly counting the number of pedestrians. The exposure time information may include a kind of length information on successive pedestrians between whom the space is smaller than a designated distance.

When the pedestrian-related information is checked, the controller 100 may check whether the number of pedestrians is larger than a preset threshold value and the exposure time is larger than a preset threshold time, at step S206.

When the check result indicates that the number of pedestrians is larger than the preset threshold value and the exposure time is larger than the preset threshold time (Y at step S206), the controller 100 may set the braking pressure to the ready state for the first level LV1 at step S207.

Based on the pedestrian-related information checked at step S205, the controller 100 may calculate a collision risk indicating the possibility that a pedestrian will walk into the route of the vehicle or a pedestrian variance index, and set the braking pressure to a ready state for a second level LV2 when the collision risk is higher than the a preset reference value (Y at step S206), at step S208.

For convenience of description, FIG. 8 shows that, when the number of pedestrians is not larger than the preset threshold value and the exposure is not larger than the preset threshold time (N at step S206), the controller 100 calculates the collision risk and checks whether the collision risk is higher than the preset reference value at step S208. However, this is only an example for convenience of description. In another embodiment, the controller 100 can immediately perform step S208 when the pedestrian-related information is checked at step S205.

In the present embodiment, the controller 100 may check the pedestrian-related information around the road, using the ambient information detector 20 or the camera sensor, regardless of whether the deceleration is present. Then, the controller 100 may previously raise the braking pressure in a stepwise manner, according to the collision risk indicating the possibility that a pedestrian will suddenly appear, thereby shortening the emergency braking time. Therefore, it is possible to more efficiently prevent a pedestrian collision accident.

In accordance with the embodiment of the present invention, the emergency braking control method for a vehicle may control the emergency braking apparatus to decrease the severity level of the temporary camera recognition fail state depending on the temporary camera recognition fail state, thereby expanding the function activation area of the emergency braking apparatus.

Furthermore, the emergency braking control method may determine whether the temporary camera recognition fail state continues, depending on the surrounding environment of a section in front, and prevent unnecessary on/off repetitions of the emergency braking apparatus through the determination, thereby expanding the function activation area of the emergency braking apparatus and improving the robustness of the emergency braking apparatus.

Furthermore, the emergency braking control method for a vehicle can previously acquire information on a section in which a pedestrian is highly likely to suddenly appear in front of the vehicle on the route where the vehicle is traveling, and previously raise braking pressure in a stepwise manner depending on the possibility that a pedestrian will suddenly appear, thereby shortening the emergency braking time.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An emergency braking control method for a vehicle, comprising:
   controlling, by a controller, an ambient information detector to take an image of surroundings of a road;
   analyzing, by the controller, the taken image to determine a severity level of a temporary camera recognition fail state; and
   controlling, by the controller, an operation of an emergency braking apparatus or setting a control strategy according to the severity level of the temporary camera recognition fail state,
   wherein:
   in the controlling of the operation of the emergency braking apparatus or the setting of the control strategy, the controller is configured to set the control strategy of the emergency braking apparatus according to environment information and a severity level on a section in front of the vehicle; and
   the controller is configured to set the control strategy of the emergency braking apparatus according to a time required for reaching the section in front of the vehicle, a time required for passing the section in front of the vehicle, and the severity level.

2. The emergency braking control method of claim 1, wherein when the controller determines the control strategy to be a control maintenance attempt on the emergency braking apparatus, the controller is configured to control a moisture remover to remove moisture on a windshield of the vehicle or to temporarily suspend the operation of the emergency braking apparatus.

3. The emergency braking control method of claim 1, the controller is configured to calculate the time required for reaching the section in front of the vehicle and the time required for passing the section in front of the vehicle based on the environment information and a speed.

4. The emergency braking control method of claim 3, wherein the environment information comprises one or more of an external environment condition, time required for a preceding vehicle to pass a preset poor environment section, a distance of the environment section, and a distance to the section in front of the vehicle.

5. An emergency braking control apparatus for a vehicle, comprising:
   an ambient information detector configured to take an image of surroundings of a road; and
   a controller configured to analyze the taken image to determine a severity level of a temporary camera recognition fail state, and control an operation of an emergency braking apparatus or set a control strategy according to the severity level of the temporary camera recognition fail state,
   wherein:
   the controller is configured to set the control strategy of the emergency braking apparatus according to environment information and a severity level on a section in front of the vehicle; and
   the controller is configured to set the control strategy of the emergency braking apparatus according to a time required for reaching the section in front of the vehicle, a time required for passing the section in front of the vehicle, and the severity level.

6. The emergency braking control apparatus of claim 5, wherein when the controller determines the control strategy to be a control maintenance attempt on the emergency braking apparatus, the controller is configured to control a moisture remover to remove moisture on a windshield of the vehicle or to temporarily suspend the operation of the emergency braking apparatus.

7. The emergency braking control apparatus of claim 5, the controller is configured to calculate the time required for reaching the section in front of the vehicle and the time required for passing the section in front of the vehicle based on the environment information and a speed of the vehicle.

* * * * *